(12) United States Patent
Martini

(10) Patent No.: US 11,364,875 B2
(45) Date of Patent: Jun. 21, 2022

(54) THEFT PROTECTION FOR AN AUTOMOBILE BY MEANS OF CONTEXT MODELLING OF AN AUTHORISED USER

(71) Applicant: GIESECKE+DEVRIENT MOBILE SECURITY GMBH, Munich (DE)

(72) Inventor: Ullrich Martini, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/973,958

(22) PCT Filed: Jun. 17, 2019

(86) PCT No.: PCT/EP2019/000190
§ 371 (c)(1),
(2) Date: Dec. 10, 2020

(87) PCT Pub. No.: WO2019/242880
PCT Pub. Date: Dec. 26, 2019

(65) Prior Publication Data
US 2021/0362677 A1    Nov. 25, 2021

(30) Foreign Application Priority Data

Jun. 22, 2018   (DE) ..................... 10 2018 004 997.4

(51) Int. Cl.
*B60R 25/24*    (2013.01)
*B60R 25/10*    (2013.01)
(Continued)

(52) U.S. Cl.
CPC ........ *B60R 25/241* (2013.01); *B60R 25/1004* (2013.01); *B60R 25/245* (2013.01);
(Continued)

(58) Field of Classification Search
None
See application file for complete search history.

(56) References Cited

U.S. PATENT DOCUMENTS 9,610,908 B2    4/2017   Siegel et al.
9,988,017 B2    6/2018   Ludger
(Continued)

FOREIGN PATENT DOCUMENTS

DE          19748406 A1    9/1999
DE      102007023140 A1   10/2008
(Continued)

OTHER PUBLICATIONS

Search Report from German Application No. 102018004997.4, dated Jan. 11, 2019.
(Continued)

*Primary Examiner* — Carlos Garcia
(74) *Attorney, Agent, or Firm* — Workman Nydegger

(57) ABSTRACT

The present invention is directed to a method for preventing a relay attack between a mobile phone and a starting device of an automobile, which allows to prevent stealing a vehicle. According to the invention, very specific movement profiles of an authorized driver or user are recognized and thereby it is prevented that an unauthorized user starts the vehicle and then steals it, in various application scenarios. This is based, among other things, on the underlying hardware components' sensor technology used. Further, the invention relates to an analogously arranged system arrangement and to a computer program product with control commands which implement the method or operate the system arrangement.

13 Claims, 2 Drawing Sheets

(51) Int. Cl.
B60R 25/33 (2013.01)
G07C 9/00 (2020.01)
H04W 4/02 (2018.01)

(52) U.S. Cl.
CPC .......... B60R 25/33 (2013.01); G07C 9/00309 (2013.01); H04W 4/027 (2013.01); B60R 2325/205 (2013.01); G07C 2009/00555 (2013.01); G07C 2209/63 (2013.01)

(56) References Cited

U.S. PATENT DOCUMENTS

| | | | |
|---|---|---|---|
| 10,225,737 B1* | 3/2019 | Mulders | H04M 1/72454 |
| 10,611,340 B2 | 4/2020 | Heinbockel et al. | |
| 10,800,380 B2 | 10/2020 | Weghaus | |
| 11,138,302 B2* | 10/2021 | Figueredo de Santana | G06K 9/00892 |
| 2013/0254857 A1 | 9/2013 | Bajenov et al. | |
| 2014/0222253 A1 | 8/2014 | Siegel et al. | |
| 2014/0340193 A1 | 11/2014 | Zivkovic et al. | |
| 2014/0375423 A1 | 12/2014 | Lagabe | |
| 2017/0158202 A1* | 6/2017 | Yang | B60W 40/08 |
| 2018/0099640 A1 | 4/2018 | Ludger | |
| 2018/0148015 A1 | 5/2018 | Weghaus | |
| 2019/0023226 A1 | 1/2019 | Heinbockel et al. | |
| 2019/0074973 A1 | 3/2019 | Hadaschik et al. | |
| 2020/0272717 A1* | 8/2020 | Figueredo de Santana | H04L 63/0861 |

FOREIGN PATENT DOCUMENTS

| | | |
|---|---|---|
| DE | 602005005305 T2 | 3/2009 |
| DE | 102011112371 A1 | 3/2013 |
| DE | 102011115760 A1 | 4/2013 |
| DE | 102014222427 A1 | 5/2016 |
| DE | 202016102327 U1 | 5/2016 |
| DE | 102015106621 A1 | 11/2016 |
| DE | 102015109468 A1 | 12/2016 |
| DE | 102015223342 A1 | 6/2017 |
| DE | 102016204750 A1 | 9/2017 |
| DE | 102016104771 A1 | 10/2017 |

OTHER PUBLICATIONS

International Search Report and Written Opinion from PCT Application No. PCT/EP2019/000190, dated Sep. 20, 2019.

* cited by examiner

THEFT PROTECTION FOR AN AUTOMOBILE BY MEANS OF CONTEXT MODELLING OF AN AUTHORISED USER

BACKGROUND

The present invention is directed to a method for preventing a relay attack between a mobile phone and a starting device of an automobile, which allows to prevent stealing a vehicle. According to the invention, very specific movement profiles of an authorized driver or user are recognized and thereby it is prevented that an unauthorized user starts the vehicle and then steals it, in various application scenarios. This is based, among other things, on the underlying hardware components' sensor technology used. Further, the invention relates to an analogously arranged system arrangement and to a computer program product with control commands which implement the method or operate the system arrangement.

DE 10 2015 223342 A1 shows a method for operating an authorization device for a vehicle, where the current location of the authorization device is ascertained. According to this print, the current location of the authorization device is ascertained again after a specified time interval.

DE 10 2016 104771 A1 shows a method for generating an authentication message using a cryptographic method. This print discloses the so-called cryptographic positioning which serves the spatially limited authentication of a person or object. This is effected by means of a mobile radio transceiver that responds to a radio inquiry.

DE 20 2016 102327 U1 shows an apparatus for preventing misuse of a radio key, in particular by extending the range. In particular, this publication recites that car thieves can misuse a system for range extension, which corresponds to a so-called relay attack.

It is known in the automotive industry, among others, to implement a contactless key system that recognizes the geographical position of a car key and then unlocks the central locking system after the driver has approached the automobile with his key. Known methods protect such a communication between the contactless key and the locking device by either encrypting the connection and/or providing cryptographic authorization mechanisms which ensure that the presented key is indeed the authentic key of the authorized driver.

In the field of intelligent credit cards or so-called smart cards, the problem is known that RFID chips used can be read out contactlessly and thus confidential data can be read out without the knowledge and will of the cardholder. Further, in such a field of application, an authentication of services is possible without the authorized cardholder giving his consent. In this field, it is known, among other things, that a wallet contains corresponding materials which shield the credit card. Thus, the basis is here the data communication as such which is inhibited.

In general, in the prior art there is discussed the problem that so-called man-in-the-middle attacks or so-called relay attacks can circumvent some security mechanisms. A man-in-the-middle attack is an attack of an unauthorized third party which intercepts data communication for authentication between two entities, records it and then presents it again without authority. Thus, actually, an authorization process is feigned which leads to the granting of services, but this process not being passed through by the actually authorized entities.

The relay attack is also an unauthorized authorization process, where the communication between the two entities is not initiated by these two themselves, but rather an attacker initiates such a communication and merely forwards messages from an inquiring entity to a service-providing entity. According to this attack scenario, it is not necessary for the attacker to read or falsify the communication itself. Applied to the scenario of theft protection for an automobile, this means that an unauthorized third party can introduce an apparatus for extending the range of a contactless key into the communication process between key and automobile. In this way, it is simulated to the automobile that the contactless key of the authorized driver is in the vicinity and the central locking system can thus be released in an authorized manner.

A substantial disadvantage of known methods and devices is that security mechanisms are based especially on so-called smart cards, which, however, do not have comprehensive sensor technology. Thus, the technical possibilities of such a smart card are very restricted and no complex methods can be implemented that make use of powerful hardware. In general, smart cards could also be retrofitted with such a hardware, but the technical effort of such a retrofit will keep the person skilled in the art from doing so. Smart cards typically have merely one induction coil which carries out the power supply. If for example a smart card is presented to a reading device, hereupon a current is induced which supplies the further electronic components of the smart card with small amounts of current for a short time. Although smart cards with independent power supply are also known, their manufacture is technically complex.

In the prior are there are also discussed specialized tokens which have a mechanical enabling mechanism, for example in the form of a button. These mechanisms can be integrated into the vehicle key for example, but require an active input by the user and moreover are subject to mechanical wear. Thus, such mechanisms reduce the user acceptance and an automatic unlocking of a vehicle is inhibited.

SUMMARY

Thus, it is an object of the present invention to propose a theft protection which can be implemented with little technical effort and yet makes possible a comfortable and automatic unlocking of an automobile. Consequently, the present object is also to merely reuse typically existing hardware components and still provide a secure method for preventing a relay attack. Further, it is an object of the present invention to propose an appropriately arranged system arrangement and a computer program product with control commands which execute the proposed method or operate the system arrangement.

Accordingly, a method for preventing a relay attack between a mobile phone and a starting device of an automobile is proposed, comprising capturing a reference movement profile using the mobile phone, in which an authorized driver approaches the automobile, takes up a driver position and actuates the starting device, determining a current movement profile which is suitable for comparison with the captured reference movement profile, comparing the captured reference movement profile with the determined current movement profile and requesting a confirmation by means of the mobile phone if the starting device is actuated and the comparison does not result in a match between the captured reference movement profile and the determined current movement profile. In particular, a mobile phone can recognize, due to its built-in sensors, whether it is moving or not and whether it is accelerating or not. Furthermore, both the automobile and the mobile phone can measure the field strength of the opposing party and thereby obtain a measure of the distance.

The person skilled in the art recognizes here that individual method steps can have further substeps and/or can be executed iteratively. For example, the capturing of a reference movement profile can be executed iteratively in such a way that an initial reference movement profile is created which is then adapted or refined in several iterations.

The present invention underlies the finding that with respect to a contactless starting operation of an automobile there are substantially three scenarios which are referred to in the following:

1. The authorized user with his key moves toward the automobile. Thereupon, the electronic end device or the key recognizes typical movement processes associated with approaching the automobile and the automobile thus comes within the range of the contactless key, whereupon the communication between the key and the automobile starts. The user then gets into the car, sits down on the driver's seat and starts the car. In particular, the movement profile and the change in the measured field strengths must be consistent.

2. In a so-called relay attack, for example, the driver sits in a restaurant, theater, cinema or the like. Typically, the user does not move here and thus the smartphone or the contactless key does not detect any movement. Nevertheless, according to this relay attack it appears that the key is approaching the vehicle. In particular, field strength changes and movement or acceleration are not consistent here. This should trigger a certain mistrust or security mechanisms. One possible reaction here is to ask the user to manually authorize a corresponding unlocking operation, for example by means of his mobile phone or pressing a button.

3. Relay attack while the authorized driver is moving. In such an attack, an unauthorized third party follows the driver who is carrying the contactless key. However, the attacker only succeeds in deceiving when he stops the authorized driver (because the authorized driver would also stop at the automobile). In this attack scenario, according to the prior art it is not easily possible to prevent an attack with little technical effort, since the driver with his contactless key actually approaches the vehicle and the movement profile appears plausible. According to the invention, however, it is recognized here that the driver follows very typical behavior rules, which can be used in a particularly advantageous way for authorization. However, this attack requires an interaction between the authorized driver and the thief or an assistant of the thief and therefore this attack is not attractive. Further, for starting the car, the movement of getting in and sitting down would have to be recognized by the mobile phone, which is unlikely.

These three application scenarios are covered by the present invention in an advantageous way, with scenario 1 being uncritical, since it is the authorized user. According to the invention, the scenarios 2 and 3 are taken into account in a particularly advantageous way in that, contrary to known methods, the mobile phone is used which typically has extensive sensor technology and computing power. Further, in contrast to so-called smart cards, the mobile phone has a reliable power supply which delivers constant current and is not dependent solely on induced current.

In addition, it was recognized that in particular when unlocking an automobile or when starting an automobile, not just any movement profiles are employed, but rather according to the invention it was recognized that each driver generates a very special movement profile, it being particularly important that during a starting operation of the vehicle the driver actually gets into the vehicle and then sits still immediately before starting. This represents a very special movement sequence, which will never be fulfilled according to scenario 3, for example, because here the driver sits in a theatre or in a restaurant, for example, which is fundamentally different from getting into a vehicle.

Thus, creating the movement profile along with approaching the vehicle inhibits an attack according to scenario 2, because a vehicle owner who is in a restaurant does not approach the vehicle. In addition, however, it is additionally advantageous that scenario 3 is taken into account by also logging in the reference movement profile that the driver actually takes up the driver position and commences the starting operation. This thus prevents an attack according to scenario 3, since the attacker would not merely have to follow the authorized vehicle owner, but would actually have to actuate the starting device in the driver position. The reference movement profile always includes that the driver sits still in the driver position immediately before a starting operation. Consequently, a starting operation is only released if the driver, in a similar way according to the learned reference movement profiles, again approaches the automobile, takes a seat and the movement profile does not change immediately before the starting operation.

Capturing a reference movement profile is a preparatory method step in which the authorized driver approaches the automobile for test purposes, takes up the driver position and actuates the starting device of the automobile. Consequently, this step can be executed iteratively and the driver can thus provide a corresponding movement profile to the underlying method which iteratively learns characteristics which must be present for enabling the automobile.

Within the framework of creating movement profiles, it is not decisive that the movement profile actually documents the starting operation of the automobile, but rather within the framework of the movement profile it is recognized that the driver always sits still and is typically even buckled up before actuating the starting device. Consequently, the movement profile in this position does not comprise any movement or substantially no movement. In the actual usage, this learned reference movement profile is taken into account or compared with regard to a currently determined movement profile. The current movement profile is a movement profile which the driver shows in the field, so to speak, i.e. in practical usage, and which is created with the help of the sensor technology of the mobile phone which the driver typically carries with him.

When capturing the reference movement profile or when determining a current movement profile, it must be ensured that the same actions exist in the current movement profile as were modelled in the reference movement profile. A current movement profile is thus suitable for comparison with the captured reference movement profile if substantially the same actions, namely approaching the automobile, taking up a driver position and a starting operation, are recorded. Within the framework of creating such profiles, sensors of the mobile phone are read out and the corresponding data are stored.

In so doing, substantially movement sensors or acceleration sensors can be employed, but this is not to be understood as a limitation. Rather, it is also possible to take into account the geographical position of both the driver and the automobile and to store this, for example, by means of GPS coordinates or mobile radio data. Mobile radio data can be data for geographical positioning which are based, for example, on the fact that the mobile phone exchanges messages with different radio masts or base stations and thereupon measures the transit time or transmission time of the individual messages. Consequently, a distance to different mobile radio masts can be inferred, from which the current position is calculated.

Then there is effected a comparison of the captured reference movement profile with the determined current movement profile, for which mathematical methods are known which put the individual data into a relation with each other. Here, it was recognized according to the invention that the movement profiles of the authorized driver typically are similar and in particular that taking up a driver position typically is effected in at least a similar manner. Thus, the basis is not only that the driver is actually approaching the automobile, but that it can be established hereby that the driver takes a seated position immediately before starting the automobile. Consequently, this relates to the stated scenario which is based on the driver for example sitting in a restaurant. If for example it is recognized that the driver has been sitting for a long time, a starting of the automobile can be avoided. Consequently, a corresponding relay attack will come to nothing, since the automobile is typically started immediately after the driver has taken up his position. In atypical cases, where the driver has been sitting in his automobile for a long time and only then actuates the starting device, this can be released in such a way that the driver confirms by means of his mobile phone that he is indeed the authorized driver and the automobile should be started.

By means of comparing the captured reference movement profile with the determined current movement profile, deviations from the typical and learned behavior of the driver can thus be identified and the driver can now be asked for a corresponding confirmation of the authorization. In case the captured reference profile substantially matches the determined current movement profile, the automobile can actually be started.

According to one aspect of the present invention, the reference movement profile and the current movement profile are captured using acceleration sensors. This has the advantage that not only geographical coordinates are used, as is shown for example by the prior art, but also a way of walking or sitting down of the driver can be taken into account. In particular, the sensors of the mobile phone make possible extended movement profiles in comparison to limited sensors of smart cards.

According to another aspect of the present invention, the acceleration sensors capture both horizontal and vertical movements as part of the reference movement profile and the current movement profile. This has the advantage that not only forward movements of the driver in the sense of approaching the automobile are detected, but rather it can also be established whether the driver actually takes up a seated position. Consequently, it can also be documented that the driver actually takes up a driver position and that the vertical position does not change while in the seated state. This in turn makes it possible to produce extended movement profiles as conventional methods are not able to do, since they only use geographical coordinates. It is also possible to examine before a possible starting operation that the driver is substantially no longer moving.

According to another aspect of the present invention, a time course of a distance between the mobile phone and the automobile is captured as part of the reference movement profile and of the current movement profile. This has the advantage that distances between the driver and the automobile can be taken into account additively to vertical and horizontal movements. This makes it possible to check plausibility and to establish that the driver is walking by means of the vertical movement, whereupon the distance is decreased. On the other hand, if for example it is recognized that the distance is decreasing without any vertical movement is effected, i.e. without the driver walking, a relay attack must be assumed. Also, a driver's way of walking can be recognized in that he or she moves slightly up and down during the individual steps and at the same time moves forward. Hereupon, the distance to the vehicle changes characteristically. Consequently, various sensor data can be combined with each other according to the invention and thus again extended movement profiles are created.

According to another aspect of the present invention, the starting device can only be actuated if the current movement profile does not indicate any movement of the mobile phone at the time of actuation. This has the advantage that it can be explicitly verified whether the driver actually takes up a seated position. A seated position is characterized in that a mobile phone which the driver carries with him does not move horizontally or vertically. If, however, it is established that the mobile phone is still moving, it can be inferred that the authorized user with his mobile phone is not sitting in the vehicle, and consequently a starting operation of the automobile can be inhibited.

According to another aspect of the present invention, if the confirmation request is negative, the starting device is locked for a predetermined period of time or until a positive request. This has the advantage that in case the confirmation does not happen, the vehicle is locked and only unlocked again once the driver releases the authorization by means of his mobile phone. If the request about confirmation is not answered or even incorrectly answered, it can be assumed that this is a case of fraud and the vehicle can be locked for 15 minutes for example. However, if this is a case of the driver having merely provided an atypical movement profile, he can answer the request himself and thus unlock the vehicle.

According to another aspect of the present invention, the comparison indicates a match if the reference movement profile and the current movement profile are equal at least to a predetermined threshold value. This has the advantage that the driver can manually adjust how restrictive the comparison is handled and that, for example, a 90% match of the reference movement profile with the current movement profile is sufficient to release the starting operation. A corresponding threshold value can also be empirically ascertained by the factory and then programmed into the underlying system.

According to another aspect of the present invention, it is checked whether the mobile phone is the same when capturing the reference movement profile, determining the current movement profile and requesting the confirmation. This has the advantage that, besides relay attacks, so-called man-in-the-middle attacks can also be thwarted, in which the attacker presents a recorded communication by means of a different apparatus. This is therefore a further security step and the proposed method can be limited to a mobile phone associated with the authorized user.

According to another aspect of the present invention, the checking comprises a readout of at least one identifier from the mobile phone. This has the advantage that personalized identifiers such as for example passwords or biometric data can also be used. If a confirmation is requested, it can be checked whether corresponding data are stored in the mobile phone, which were also present when the reference movement profile was captured. Consequently, it is also possible to deposit signatures in the mobile phone which can be verified.

According to another aspect of the present invention, the checking comprises a readout of a security element of the mobile phone. This has the advantage that SIM cards or integrated SIM cards can also be used, which are especially safeguarded by hardware technology and/or by software technology. For example, a so-called embedded Universal Integrated Circuit Card, eUICC, can be used, and known identification numbers can be used with respect to their existence both when creating the reference profile and when confirming the request.

According to another aspect of the present invention, a mobile radio link is arranged between the automobile and the mobile phone for requesting the confirmation. This has the advantage that in the case of a conspicuous movement profile, the authorized user can be contacted and informed for example by means of an application or a text message that an unidentifiable movement profile is present. The authorized user then has the possibility to either give or refuse the confirmation.

According to another aspect of the present invention, the reference movement profile and the current movement profile are captured using geographical coordinates. This has the advantage that various further sensors in the acceleration sensors can enrich the profiles and thus comprehensive movement profiles can be used. In this way, a relay attack can be detected from the start if the authorized user with his mobile phone is outside the range of the automobile. If for example the driver is sitting in a restaurant and has parked his vehicle in a parking lot, it can be calculated on the basis of the geographical coordinates alone that an unlocking is not intended, even if a radio path is actually set up between the automobile and the mobile phone by an interference of unauthorized third parties. Such a bridging is then prevented and the geographical coordinates give a clear indication of the actual whereabouts of the automobile and the mobile phone.

According to another aspect of the present invention, the reference movement profile and the current movement profile are captured using respectively at least one GPS coordinate and/or message transmission durations at at least one mobile radio mast. This has the advantage that the position of the mobile phone can be established at any time, since typically either a GPS coordinate is available or else a relative distance to mobile radio masts. Typically, there is even a positioning possibility within buildings, even if no GPS data are retrievable. For example, it is well known in the mobile radio field to send inquiries to neighboring mobile radio masts and in doing so calculate latency times. With reference to the delay of an answer it can be recognized how far the mobile phone is from different mobile radio masts and thus the geographical position can be calculated.

The object is also achieved by a system arrangement for preventing a relay attack between a mobile phone and a starting device of an automobile, comprising the mobile phone arranged for capturing a reference movement profile using the mobile phone, in which an authorized driver approaches the automobile, takes up a driver position and actuates the starting device, the same mobile phone being further arranged for determining a current movement profile which is suitable for comparison with the captured reference movement profile, and an authorization unit being arranged for comparing the captured reference movement profile with the determined current movement profile, and the mobile phone being arranged to request a confirmation if the starting device is actuated and the comparison does not result in a match between the captured reference movement profile and the determined current movement profile.

The proposed system arrangement may comprise further structural features which for example set up a mobile radio link between the automobile and the mobile phone. The authorization unit can be built into the mobile phone or in the automobile.

The object is also achieved by a computer program product with control commands which execute the method or operate the system arrangement.

According to the invention, it is particularly advantageous that the proposed method has method steps which can also be functionally reproduced as structural features of the system arrangement. The system arrangement further comprises structural features which can also be implemented as method steps with regard to their function. The computer program product is used both for executing the method and for operating the system arrangement. Altogether, the method is arranged to operate the system arrangement and the system arrangement in turn is suitable for executing the method.

BRIEF DESCRIPTION OF THE DRAWINGS

Further advantageous configurations are explained in more detail with reference to the attached Figures. There are shown.

DETAILED DESCRIPTION OF VARIOUS EMBODIMENTS

Figure 1:
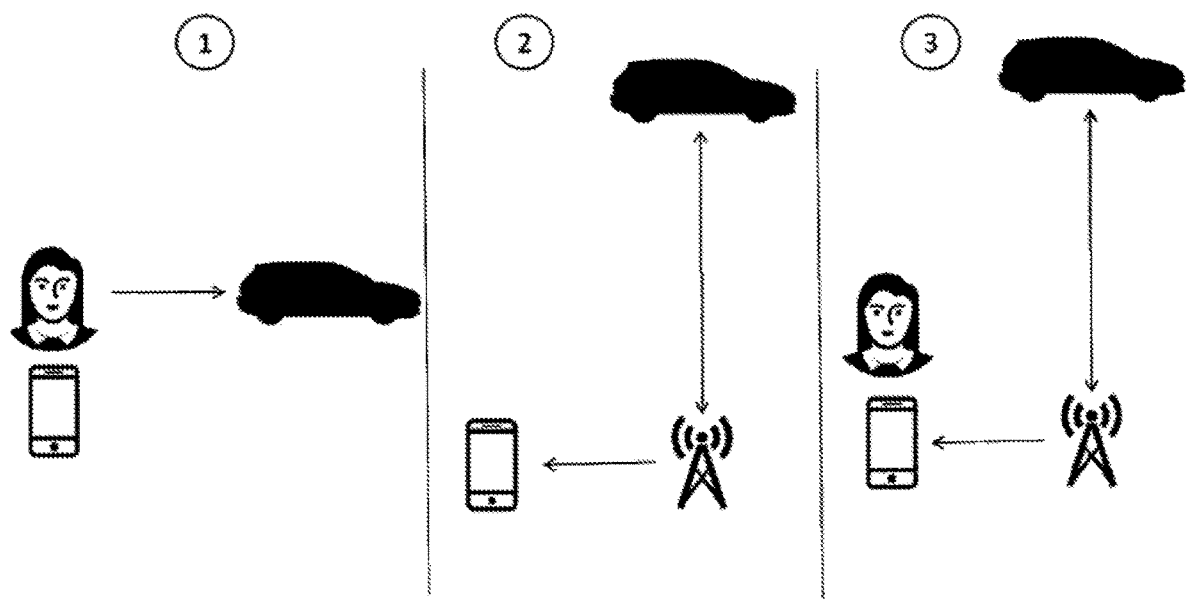
FIG. 1: a schematic diagram which illustrates three application scenarios of the present invention.

FIG. 1 is based on the already mentioned scenarios which underlie the present invention. According to a first scenario on the left side, an authorized user has a mobile phone which is also arranged to be authorized to unlock an automobile and start the engine. The mobile phone thus captures a walking or sitting of the user and for this uses acceleration sensors, among other things. This application scenario is uncritical, since the user here is authorized and no attacks take place. In particular, no man-in-the-middle attacks or relay attacks take place.

In contrast, a second scenario is shown in the center, where a so-called range extender, i.e. a device geographically extending the radio link, is provided. This device is interconnected between the mobile phone and the communication interface of the automobile and pretends to the automobile that the mobile phone is located in the vicinity. However, this attack is to make possible that the mobile phone actually permits the automobile to be unlocked or started, although the mobile phone is only putatively in the vicinity and actually arranged at a distance.

Here, the case may be that the mobile phone was handed in at a cloakroom together with clothing and the authorized user is actually not present. In this case, no movement of the user is detected either as he is in a theatre for example. The attacker can putatively bring the mobile phone towards the automobile, which pretends to the automobile that the mobile phone is actually approaching. In the present case, however, such an attack is prevented according to the invention, since the system has learned a very specific movement profile which each individual has associated therewith. Further, the movement profiles are captured with the help of different sensors of the mobile phone and this is not apparent to the attacker. Thus, the radio link between the automobile and the mobile phone can be artificially set up or extended, but since the movement profile is captured with the help of the mobile phone, it becomes apparent that the driver for example does not move or does not move characteristically.

If the driver who is actually authorized is sitting in a restaurant and an attacker approaches the vehicle with the so-called range extender, it is still recognized that the expected movement profile is not present. For this, the attacker would have to utilize the interconnected apparatus to create a corresponding movement profile and with this even behave in such a characteristic way that the authorized driver is simulated. This is typically not possible, and in particular the attacker does not know the underlying method and therefore does not know which data are contained in such a movement profile. Consequently, this attack is effectively inhibited.

On the right side in the present FIG. 1, another security-critical scenario 3 is shown, in which the authorized user is not in a sitting position, but rather the authorized driver for example moves past the automobile. Here, however, again the reference movement profile can be verified, which has recorded that the driver has taken up a driver position. However, as the authorized driver moves past the vehicle, such a seated position is not recognized and the starting operation is prevented. It is thus an advantage that the reference movement profile does not document the actual starting operation of the vehicle, but rather documents with the help of the reference movement profile that before the driver actuates the starting device he is sitting or is no longer moving. Thus, it is always required that the driver approaches the automobile, takes up a driver position, and in addition the seating operation is documented, since during the creation of the reference movement profile the driver actuates the starting device. And this he will cause during the creation of the reference movement profile only while seated. Thus, also this third attack scenario is addressed.

Figure 2:
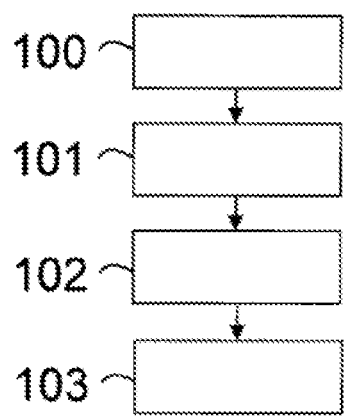
FIG. 2: a schematic flow chart of a method for preventing a relay attack according to an aspect of the present invention.

FIG. 2 shows a method for preventing a relay attack between a mobile phone and a starting device of an automobile, comprising capturing 100 a reference movement profile using the mobile phone, in which an authorized driver approaches the automobile, takes up a driver position and actuates a starting device, determining 101 a current movement profile which is suitable for comparison with the captured 100 reference movement profile, comparing 102 the captured 100 reference movement profile with the determined 101 current movement profile, and requesting 103 a confirmation by means of the mobile phone if the starting device is actuated and the comparing 102 does not result in a match between the captured 100 reference movement profile and the determined 101 current movement profile.

The person skilled in the art recognizes here that individual method steps are executed iteratively and partly can have substeps. For example, capturing 100 a reference movement profile can be effected iteratively and thus the reference movement profile can always be refined.

The invention claimed is:

1. A method for preventing a relay attack between a mobile phone and a starting device of an automobile, comprising:
   capturing a reference movement profile using the mobile phone, in which an authorized driver approaches the automobile, takes up a driver position and actuates a starting device;
   determining a current movement profile which is suitable for comparison with the captured reference movement profile;
   comparing the captured reference movement profile with the determined current movement profile; and
   requesting a confirmation by means of the mobile phone if the starting device is actuated and the comparing does not result in a match between the captured reference movement profile and the determined current movement profile;
   wherein a time course of a distance between the mobile phone and the automobile is captured as part of the reference movement profile and of the current movement profile.

2. The method according to claim 1, wherein the reference movement profile and the current movement profile are captured using acceleration sensors.

3. The method according to claim 2, wherein the acceleration sensors capture both horizontal and vertical movements as part of the reference movement profile and of the current movement profile.

4. The method according to claim 1, wherein it is checked whether the mobile phone is the same when capturing the reference movement profile, determining the current movement profile and requesting the confirmation.

5. The method according to claim 4, wherein the checking comprises a readout of at least one identifier from the mobile phone.

6. The method according to claim 4, wherein the checking comprises a readout of a security element of the mobile phone.

7. The method according to claim 1, wherein the starting device can only be actuated if the current movement profile does not indicate any movement of the mobile phone at the time of actuation.

8. The method according to claim 1, wherein in the event of a negative request of the confirmation the starting device is locked for a predeterminable period of time or until a positive request.

9. The method according to claim 1, wherein the comparing indicates a match if the reference movement profile and the current movement profile are equal at least to a predetermined threshold value.

10. The method according to claim 1, wherein a mobile radio link is arranged between the automobile and the mobile phone for requesting the confirmation.

11. The method according to claim 1, wherein the reference movement profile and the current movement profile are captured using geographical coordinates.

12. The method according to claim 1, wherein the reference movement profile and the current movement profile are captured using respectively at least one GPS coordinate and/or message transmission durations of at least one mobile radio mast.

13. A system arrangement for preventing a relay attack between a mobile phone and a starting device of an automobile, comprising:
   the mobile phone arranged for capturing a reference movement profile using the mobile phone, in which an authorized driver approaches the automobile, takes up a driver position and actuates the starting device, wherein the same mobile phone is further arranged for determining a current movement profile which is suitable for comparison with the captured reference movement profile; and
   an authorization unit arranged for comparing the captured reference movement profile with the determined current movement profile; and the mobile phone being arranged for requesting a confirmation if the starting device is actuated and the comparing does not result in a match between the captured reference movement profile and the determined current movement profile; wherein a time course of a distance between the mobile phone and the automobile is captured as part of the reference movement profile and of the current movement profile.

* * * * *